United States Patent [19]
Klink et al.

[11] Patent Number: 5,212,024
[45] Date of Patent: May 18, 1993

[54] BATTERY BOX WITH A CIRCULATING FLOW CHANNEL

[75] Inventors: Rainer Klink, Kernen; Johann German, Weinstadt, both of Fed. Rep. of Germany

[73] Assignee: Deutsche Automobilgesellschaft mbH, Stuttgart, Fed. Rep. of Germany

[21] Appl. No.: 884,086

[22] Filed: May 18, 1992

[30] Foreign Application Priority Data

May 17, 1917 [DE] Fed. Rep. of Germany ....... 4116253

[51] Int. Cl.$^5$ .............................................. H01M 2/38
[52] U.S. Cl. ...................................... 429/72; 429/81; 429/120; 429/159
[58] Field of Search ..................... 429/72, 81, 120, 71, 429/163, 176, 159, 148, 149

[56] References Cited

U.S. PATENT DOCUMENTS

| | | | |
|---|---|---|---|
| 2,273,244 | 2/1942 | Ambruster | 429/120 X |
| 3,388,003 | 6/1968 | Jackley | 429/81 |
| 4,107,402 | 8/1978 | Dougherty et al. | 429/120 |
| 4,421,831 | 12/1983 | Garcia, Jr. | 429/70 |
| 4,421,832 | 12/1983 | Uba | 429/72 |
| 4,435,487 | 3/1984 | Supelak et al. | 429/70 |
| 4,522,898 | 6/1985 | Esrom | 429/120 |
| 4,865,929 | 9/1989 | Eck | 429/120 |

FOREIGN PATENT DOCUMENTS

| | | |
|---|---|---|
| 0114233 | 8/1984 | European Pat. Off. |
| 2835501 | 3/1990 | Fed. Rep. of Germany |
| 2027978 | 2/1980 | United Kingdom |

Primary Examiner—Anthony Skapars
Attorney, Agent, or Firm—Evenson, McKeown, Edwards & Lenahan

[57] ABSTRACT

A battery box for a plurality of electrochemical cells which are arranged in rows one behind the other, a circulating-flow channel being formed by a spacing of the cells from one another within each row, through which a fluid can flow. The circulating-flow channels are all fluidically connected to an inlet channel which tapers in the flow direction and is arranged in the vicinity of the box bottom, and to an outlet channel which expands in the flow direction and is arranged in the vicinity of the box lid. To secure the individual cells, the side walls are provided, in the vicinity of the box bottom, with step-type ledges on which the cells are arranged in a vertically staggered manner in the vicinity of their bottom side edges. The slope of the ledges corresponds in magnitude and direction to the taper of the inlet channel on the bottom side, and the width of a step of the ledge corresponds to the depth of the housing of a cell, plus the corresponding clearance of the circulating-flow channel.

15 Claims, 3 Drawing Sheets

BATTERY BOX WITH A CIRCULATING FLOW CHANNEL

BACKGROUND AND SUMMARY OF THE INVENTION

The present invention relates to a battery box for a plurality of cells in an electrochemical storage battery.

German Patent Specification 28 35 501 discloses a battery box in which, a series of cells of electrochemical stores are arranged one behind the other in rows that are offset in parallel to one another. A circulating-flow channel, formed by a spacing of the cells from one another through which a temperature controlling fluid can flow (the capacity of the electrochemical stores being temperature dependent), is arranged between adjacent cells. The circulating-flow channels are connected both to an inlet channel and to an outlet channel. The inlet channel, which tapers (that is, decreases in size) in the flow direction, is arranged in the vicinity of the box bottom and the outlet channel, which expands in the flow direction, is arranged in the vicinity of the box lid. However, the arrangement of the cells inside the battery box is shown only diagrammatically, and a technical teaching for a device for positioning the cells inside the battery box is not disclosed. If arranged, for example, in the base section of a vehicle, these battery boxes are generally made of sheet metal, which is quite heavy. Furthermore, such a battery box must have a high strength or flexural rigidity, which also increases its weight. Such high weight is especially troublesome, for example, in a battery operated motor vehicle.

The object of the present invention is therefore to develop a battery box in which the cells can be assembled and accommodated with uniform temperature control, while maintaining a high strength or flexural rigidity, and a low weight compared with the total weight of the installed cells.

This object is achieved according to the invention by a battery box in which the bottoms of the cells are placed on step-type ledges, which have a transverse width that is only a fraction of the width of a cell, and are attached to the side walls of the battery box (for example, by gluing, screwing or welding) in order to keep the circulating-flow channels open. The step dimension of each step of the ledge corresponds to the depth of the housing of a cell plus the corresponding clearance of the circulating-flow channel, thereby ensuring the circulating flow of the temperature controlling fluid. Furthermore, the inlet channel is formed at the bottom of the battery box, between the bottoms of the cells and the box bottom; and the outlet channel is formed in an equivalent way between the top of the cells and the box lid.

As disclosed in the prior art, if a plurality of cell rows is arranged adjacent one another, it is advisable to provide a partition between adjacent cell rows, such partition having symmetrical step-type ledges on both sides. As a result, mutual insulation of the cells placed in rows and a further positional fixing of the individual cells is achieved.

So that a cell housing placed on the ledges is fixed by a positive lock in every direction in the plane of the step, it is advantageous to arrange, at the edge of every step at the top of the ledges, a transversely extending spacing rib whose thickness corresponds approximately to the spacing between adjacent cells, and consequently to the corresponding clearance of the circulating-flow channels. These spacing ribs may beneficially be provided in their upper end region with chambers so that the individual cells can be more readily introduced.

Battery boxes with very long rows of cells, or with a plurality of rows arranged alongside one another, may bulge. It 10 is therefore advantageous to mutually stabilize the side walls and/or the partitions by braces which extend transversely to their longitudinal extension, and which, in particular, are arranged at the height of the ledges, so that the flexural rigidity of the battery box is simultaneously increased with a very low increase in mass.

To better secure the position of the individual cells, it may be beneficial to arrange spacing strips for bracing against the cells on the end walls of the battery box which are situated transversely to the cell rows. In addition it may also be beneficial to provide the side walls and/or partitions of the battery box in the region situated between two adjacent cell housings with vertically extending stop strips. Furthermore, the electrical cell connectors of the cells can be of mechanically robust design, so that the cells are also rigidly interconnected at their terminal pillars. If, because of an extended arrangement of rows of cells, such a high weight now results that the ledges might be too highly loaded, it is advisable to brace the ledges against the box bottom. This can be done, on the one hand, by extending the partition down to the box bottom, as a result of which a plurality of inlet channels are simultaneously formed or, on the other hand, by individual column-type supports.

Where a plurality of rows of cells have to be installed in a mutually insulated manner, it is advantageous to form the partitions up to the vicinity of the top of the cells, which also helps to increase the flexural rigidity of the battery box.

Other objects, advantages and novel features of the present invention will become apparent from the following detailed description of the invention when considered in conjunction with the accompanying drawings.

BRIEF DESCRIPTION OF THE DRAWINGS

The invention is explained in greater detail by reference to an exemplary embodiment shown in the drawings. In the drawings.

DETAILED DESCRIPTION OF THE DRAWINGS

Figure 1:
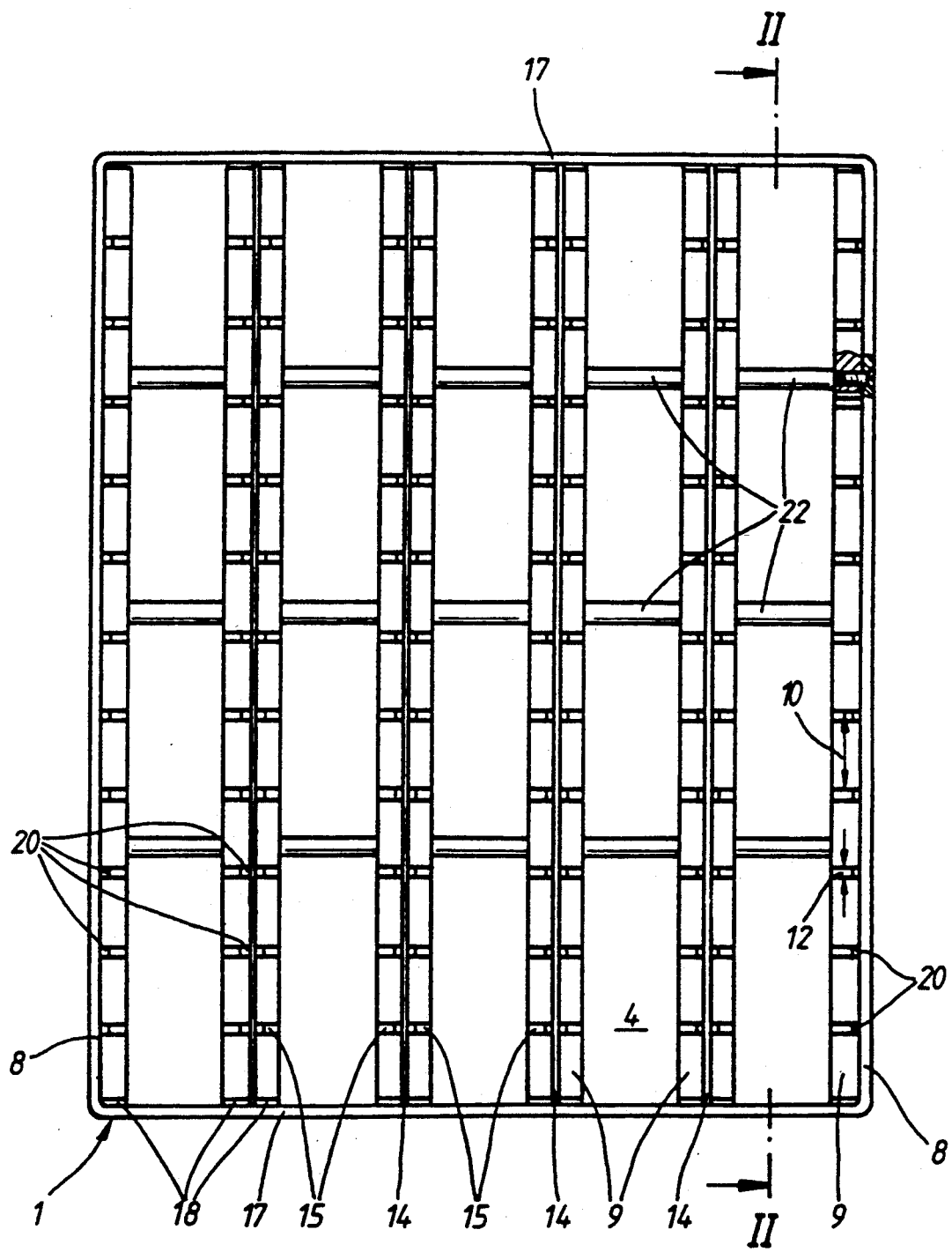
FIG. 1 is a plan view of a battery box for a plurality of arrangements of rows of cells according to the invention.
Figure 4:
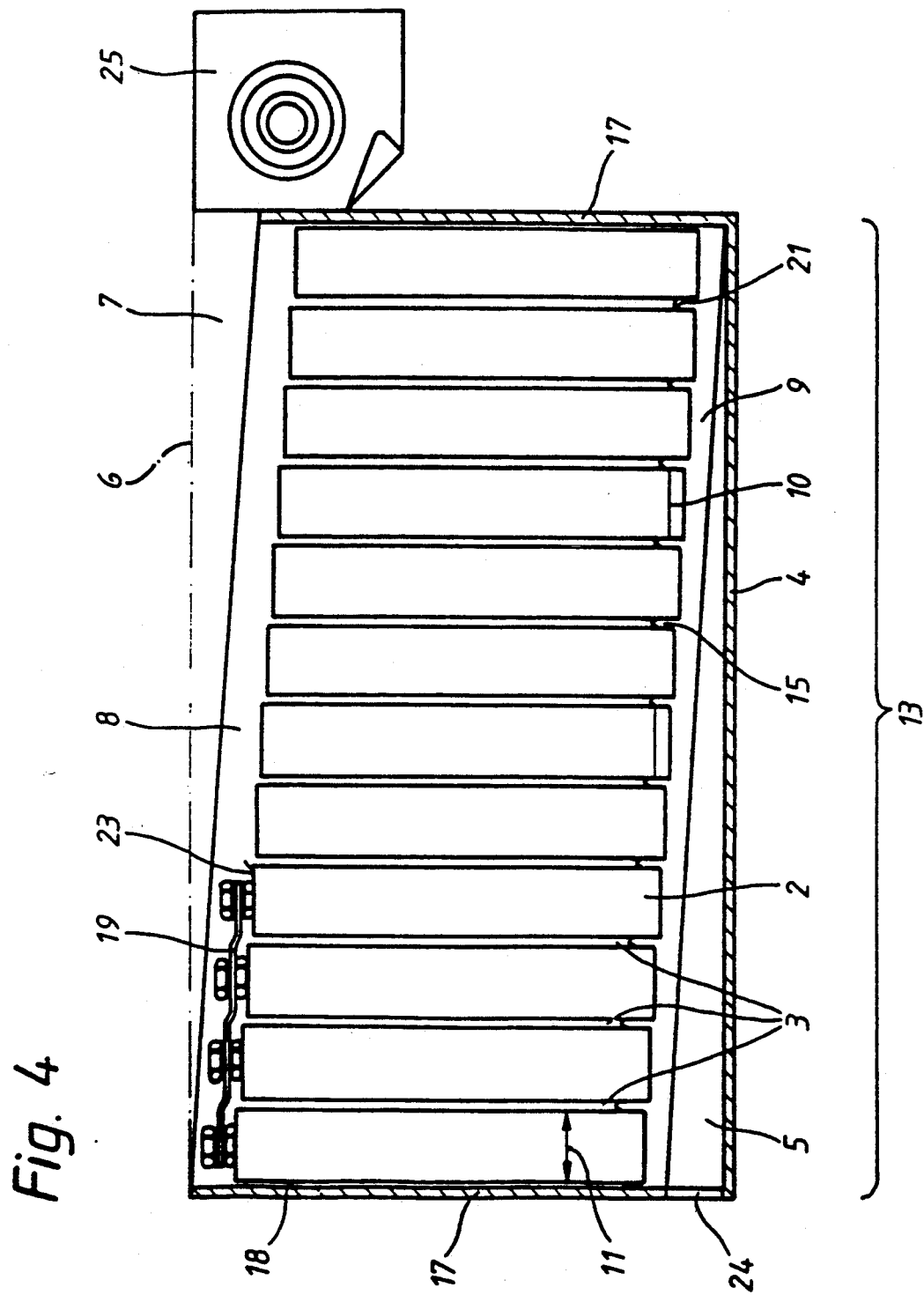
FIG. 4 shows a longitudinal cross section through a battery box with a few cells installed.

FIG. 1 shows a plan view of the battery box i (advantageously made of plastic for insulation reasons), with the lid removed. The walls of the battery box 1 are formed by the side walls 8 and the end walls 17. The battery box 1 of this exemplary embodiment is intended for sixty cells 2 arranged in five rows 13, each containing twelve cells 2, as shown in Figure 4. Each individual cell row 13 has a step-type ledge 9 formed by a series of steps along its bottom edges. (See FIG. 4.) The width 10 of each individual step of the ledge 9 corresponds to the sum of the depth 11 of the housing of a cell 2 (FIG. 4) plus the corresponding clearance 12 of the circulating-flow channel 3 formed by the spacing of adjacent cells 2 from one another.

Figure 2:
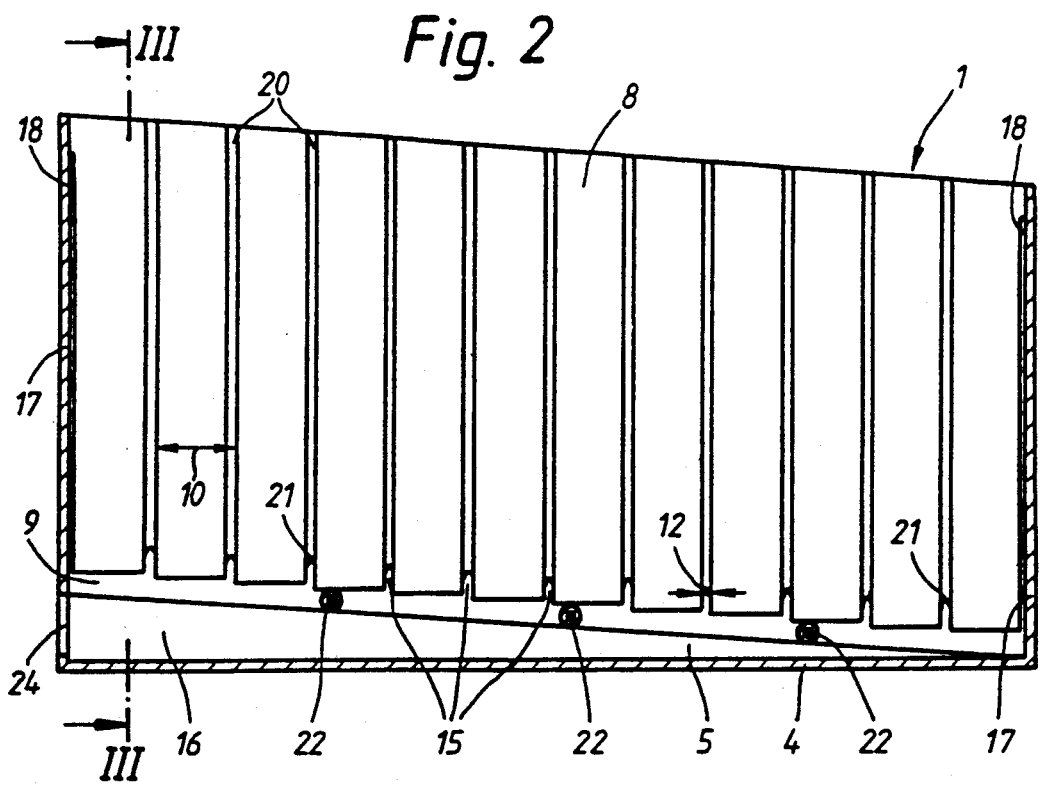
FIG. 2 shows a longitudinal cross section through the battery box of FIG. 1, along the line II—II.
Figure 3:
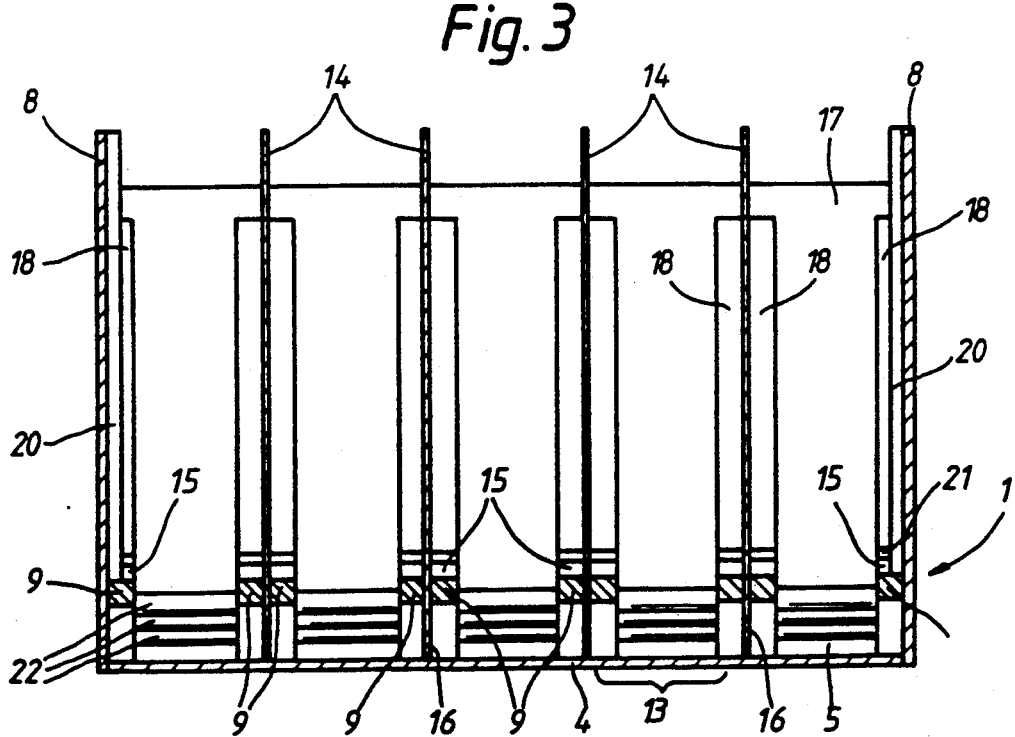
FIG. 3 shows a battery box in transverse cross section along the line III—III in FIG. 2.

Between steps of the ledge 9, attached to the side walls 8 or to the partitions 14 separating the cell rows 13 from one another, there are arranged spacing ribs 15 which extend transversely to the longitudinal direction of the row and which have chamfers 21 in their upper region (FIGS. 2, 3). Arranged at the position of the spacing ribs 15 are stop strips 20 which extend vertically at the side walls 8 or the partitions 14, and which are likewise used to secure the installed cells 2. Furthermore, two spacing strips 18, which brace the cells 2 against the end walls 17, are arranged at the height of the ledges 9 against the respective end walls 17, likewise for the purpose of securing the cells 2, and stabilizing them against the vibrational stresses. Transverse ties 22 are arranged in the vicinity of the ledges 9 and aligned parallel with the end walls 17, to stabilize the battery box 1; such ties 22 may also be surrounded by spacing sleeves in the vicinity of a cell row 13. In this connection, however, it should be ensured that the transverse ties 22 are not arranged in the vicinity of a circulating-flow channel 3, which they would of course otherwise close or impair.

The circulating-flow channels 3 are fluidically connected to an inlet channel 5 (FIGS. 2, 4) which is formed at the bottom of the battery box 1 between the box bottom 4 and the bottoms of the installed cells 2, and tapers in the flow direction due to the angled arrangement of the ledges 9 with respect to the box bottom 4. It has been found in practice that an angle of between 2.5° and 6° is favorable for this purpose. Furthermore, to achieve optimum heat transmission, it is advantageous to arrange the circulating-flow channels 3 between the wide sides of the cells 2 with a width of between 2 mm and 5 mm. The circulating-flow channels 3 discharge at the top 23 of the cells 2 into an outlet channel 7 (FIG. 4) formed by the gap between the box lid 6 and the top 23 of the cells and which expands in the flow direction.

A cross-flow impeller 25 (preferably with sucking action) may be mounted at the drain of the outlet channel 7. However, depending on the application purpose of such a battery box 1, the flow direction of the temperature-controlling fluid can also be reversed, so that, with the same constructional embodiment of the battery box 1, the former outlet channel 7 would correspond to the inlet channel, and the former inlet channel 5 to the outlet channel. If, for example, the individual cells 2 are to be heated, it is furthermore possible to mount a heater (not shown) in the vicinity of the inlet channel 5 or of an inflow opening 24 associated with it.

Since the battery box 1 of the exemplary embodiment has several cell rows 13 arranged parallel to one another, the individual cell rows 13 are separated by partitions 14 extending parallel to the side walls 8. Such partitions 14 serve, on the one hand, to fix the position of the cells 2, and (for example if cells with metal housings are used) to electrically insulate the cell rows 13 from one another as well. For this reason they are advantageously made of an electrically insulating material. In order to help support the weight of the cells 2 placed with their bottoms on the ledges 9, it is beneficial to extend the partitions 14 as a support 16 down to the box bottom 4. In this case, battery box 1 then has five inlet channels 5, separated from one another by the supports 16 and dam connected via the circulating-flow channels 3 to the outlet channel 7. It is therefore expedient to assign each inlet channel 5 its own inflow opening 24 or to interconnect them fluidically.

In addition to the previous measures, such as spacing ribs 15, partitions 14, stop strips 20 and spacing strips 18, which are all made of an insulating material (in particular, plastic, if cell housing insulating is necessary and also for weight reasons), in order to stabilize the installed cells 2 still further, the metallic cell connectors 19 (FIG. 4) which electrically connect the terminals of the cells 2 are mechanically rigid and bent at right angles in accordance with the step height. As a result, the cells 2 are also fixed by their terminal pillars at the top. To avoid electrical short circuits between the terminals and a box lid 6 which may be made of metal sheet, plastic caps may be pushed over the pole screws or pole nuts, and the cell connectors 19 may be insulated in the central region, for example, by shrink-on sleeves.

In the manner shown, a rigid, solid and self-supporting battery box 1 whose weight is substantially less than the weight of the cells 2 is obtained. Because of the rigidity of this equipment, the battery box can be built with a weight which is only approximately 5% of the weight of the installed cells 2.

If such a battery box is used in particular in the vicinity of the bottom of an electrically operated motor vehicle, it may be beneficial to construct the box bottom 4 at an angle so that, if the battery box 1 is arranged, for example, in the vicinity of the rear axle, the angle of slope of the vehicle is increased. In this case, it may be that the ledges 9 are almost horizontal, and have only a slight step form. However, due to the sloped box bottom 4 the angle between the ledges 9 and the box bottom 4 is still between 2.5° and 6°. In such a case, the entry opening 24 is beneficially protected by a scoop or a labyrinth-type air guide against the entry of dirt since it is at the front in the direction of travel. The standing arrangement of the cells 2 is advantageous in this connection since a fluid heated in the circulating-flow channels 3 while cooling the individual cells 2 flows upwards by convection and, consequently the pumping or suction capacity required of the transverse flow 10 impeller 25 is lower.

The battery boxes 1 may be made using either individual parts made of thermoplastic (for example of polystyrene), or in the case of fairly large piece numbers, by injection molding such as, for example, from fiber-reinforced polypropylene. Bores into which insulated can be arranged in the side walls more convenient handling.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. Battery box for a plurality of electrochemical cells which are arranged in rows, with individual cells in each row being disposed one behind the other, and a circulating-flow channel being formed between housings of adjacent cells within each row by a spacing of said adjacent cells from one another, through which circulating-flow channels a fluid can flow, said circulating-flow channels all being fluidically connected to an inlet channel which tapers in the flow direction and is arranged in the vicinity of a box bottom, and to an outlet channel which expands in the flow direction and is arranged in the vicinity of a box lid, wherein the side walls of the battery box are provided with a step-type ledge for the staggered vertical arrangement of cells within each row, the bottoms of said cells being positioned on said steps, the slope of said ledge corresponding in magnitude and direction to the taper of the inlet channel on the bottom side, and the step dimension of the step form of the ledge corresponding to the depth of a cell plus the corresponding width of the spacing between adjacent cells within each row, which forms the circulating-flow channel.

2. Battery box according to claim 1, wherein a plurality of cell rows are arranged adjacent one another and a partition provided symmetrically with step-type ledges on both sides is arranged between adjacent cell rows.

3. Battery box according to claim 1, wherein a transversely extending spacing rib having a thickness which corresponds approximately to the spacing between adjacent cells within a row is arranged at every step at the top edge of the ledges.

4. Battery box according to claim 3, wherein the spacing ribs have at least one chamfer in an upper end region thereof.

5. Battery box according to claim 1, wherein spacing strips situated transversely to the cell rows are arranged at end walls of the battery box.

6. Battery box according to claim 1, wherein side walls of the battery box in regions situated between two adjacent cells are provided with vertically extending stop strips.

7. Battery box according to claim 1, wherein the side walls of the battery box are mutually stabilized by transverse ties extending transversely to a longitudinal extension thereof, and arranged below the ledges.

8. Battery box according to claim 1, wherein the electrical cell connectors also rigidly interconnect the cells mechanically.

9. Battery box according to claim 8, wherein the cell connectors are bent at right angles in accordance with a step height of the ledges.

10. Battery box according to claim 1, wherein the angle between the box bottom and ledges is between 2.5° and 6°.

11. Battery box according to claim 1, wherein the spacing between adjacent cells of a cell row is between 2 mm and 5 mm.

12. Battery box according to claim 2, wherein said partitions extend up to an upper edge of the cells.

13. Battery box according to claim 2, wherein the ledges of the partitions are braced against the box bottom.

14. Battery box according to claim 2, wherein said partitions situated between adjacent cells are provided with vertically extending stop strips.

15. Battery box according to claim 2, wherein the partitions are mutually stabilized by transverse ties which extend transversely to their longitudinal extension and are arranged below the ledges.

* * * * *